(12) United States Patent
Calle et al.

(10) Patent No.: US 11,925,155 B2
(45) Date of Patent: *Mar. 12, 2024

(54) EARTH WALL HAVING A POCKET STRUCTURE FOR RECEIVING VEGETATION AND METHOD FOR FORMING AN EARTH WALL

(71) Applicants: Jon Calle, Chester Springs, PA (US); Sean O'Donnell, Glenmoore, PA (US)

(72) Inventors: Jon Calle, Chester Springs, PA (US); Sean O'Donnell, Glenmoore, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/385,644

(22) Filed: Jul. 26, 2021

(65) Prior Publication Data

US 2022/0015303 A1     Jan. 20, 2022

Related U.S. Application Data

(63) Continuation of application No. 15/954,992, filed on Apr. 17, 2018, now Pat. No. 11,071,256.

(60) Provisional application No. 62/486,187, filed on Apr. 17, 2017.

(51) Int. Cl.
| | | |
|---|---|---|
| *E02D 29/02* | (2006.01) | |
| *A01G 9/02* | (2018.01) | |
| *A01G 25/02* | (2006.01) | |

(52) U.S. Cl.
CPC .............. *A01G 9/025* (2013.01); *A01G 25/02* (2013.01); *A01G 25/023* (2013.01); *E02D 29/0283* (2013.01); *E02D 2200/13* (2013.01); *E02D 2250/00* (2013.01); *E02D 2300/0006* (2013.01); *E02D 2300/0026* (2013.01); *E02D 2300/0075* (2013.01)

(58) Field of Classification Search
CPC .. A01G 9/025; A01G 25/023; E02D 29/0283; E02D 29/00; E02D 2200/13; E02D 29/02
See application file for complete search history.

(56) References Cited

U.S. PATENT DOCUMENTS

| | | |
|---|---|---|
| 4,117,686 A | 10/1978 | Hilfiker |
| 4,329,089 A | 5/1982 | Hilfiker et al. |
| 4,505,621 A | 3/1985 | Hilfiker et al. |

(Continued)

FOREIGN PATENT DOCUMENTS

| | | |
|---|---|---|
| DE | 102010024555 A1 | 12/2011 |
| EP | 2399449 A2 | 12/2011 |

(Continued)

OTHER PUBLICATIONS

U.S. Pat. No. 4,329,069 A (Hilfiker et al.) May 11, 1982, Entire document, especially figs. 1-2.

(Continued)

*Primary Examiner* — Sean D Andrish
(74) *Attorney, Agent, or Firm* — Condo Roccia Koptiw LLP

(57) ABSTRACT

A pocket structure for receiving containerized plants is sloped and hung from a wire of a wire basket. The pocket structure includes hooks, an irrigation fitting and corresponding drip channel to transmit water toward the rear of the pocket, and slots in the walls. The mesh units include braces and are sized for shipping. An earth wall is formed of the mesh units and pockets, and includes irrigation tubing.

29 Claims, 16 Drawing Sheets

(56) References Cited

U.S. PATENT DOCUMENTS

| | | | |
|---|---|---|---|
| D290,179 S | 6/1987 | Peltola | |
| D315,757 S | 3/1991 | Klitsner | |
| 5,064,090 A | 11/1991 | Farrier | |
| 5,076,735 A | 12/1991 | Hilfiker | |
| D326,552 S | 5/1992 | Goodell | |
| D327,560 S | 6/1992 | Hradisky | |
| 5,156,496 A | 10/1992 | Vidal et al. | |
| D339,942 S | 10/1993 | Emalfarb et al. | |
| D348,128 S | 6/1994 | Craft et al. | |
| D350,423 S | 9/1994 | Craft, Jr. et al. | |
| 5,417,338 A | 5/1995 | Roy et al. | |
| D359,850 S | 7/1995 | Staubitz et al. | |
| D360,116 S | 7/1995 | Fillipp | |
| 5,445,397 A | 8/1995 | Evans | |
| D370,701 S | 6/1996 | Thomsen | |
| 5,579,603 A | 12/1996 | Fukuzumi | |
| 5,622,455 A | 4/1997 | Anderson et al. | |
| 5,647,695 A | 7/1997 | Hilfiker et al. | |
| 5,683,744 A | 11/1997 | Jolly et al. | |
| 5,722,799 A | 3/1998 | Hilfiker | |
| 5,878,908 A | 3/1999 | Foley | |
| 5,947,643 A | 9/1999 | Anderson et al. | |
| 5,951,209 A | 9/1999 | Anderson et al. | |
| D417,114 S | 11/1999 | Rehmert et al. | |
| D438,010 S | 2/2001 | Drury et al. | |
| D459,077 S | 6/2002 | Krivulin | |
| D462,033 S | 8/2002 | Reichert | |
| D466,013 S | 11/2002 | Nance | |
| 7,073,983 B2 | 7/2006 | Hilfiker et al. | |
| D564,758 S | 3/2008 | Drury | |
| D581,670 S | 12/2008 | Neilsen | |
| 7,544,015 B2 | 6/2009 | Kallen | |
| D602,667 S | 10/2009 | Barbieri | |
| D603,197 S | 11/2009 | Hrovat | |
| D606,313 S | 12/2009 | Neilsen | |
| 8,197,159 B2 | 6/2012 | Ridgway | |
| D675,127 S | 1/2013 | Dimaggio | |
| D681,334 S | 5/2013 | Goodell | |
| 8,479,444 B2 | 7/2013 | Mesiara | |
| 8,562,259 B2 | 10/2013 | Ridgway et al. | |
| 8,616,807 B2 | 12/2013 | Ogorchock | |
| 8,632,278 B2 | 1/2014 | Taylor | |
| 8,683,744 B2 | 4/2014 | Chang | |
| 8,734,059 B2 | 5/2014 | Taylor | |
| D724,481 S | 3/2015 | Blouin | |
| D730,079 S | 5/2015 | Lee et al. | |
| D734,958 S | 7/2015 | Gosling et al. | |
| D742,279 S | 11/2015 | Takaoka | |
| D820,722 S | 6/2018 | Shaffer et al. | |
| D833,166 S | 11/2018 | Lawson et al. | |
| D840,264 S | 2/2019 | Ryan | |
| 11,071,256 B2 * | 7/2021 | Calle | A01G 9/025 |
| D1,004,171 S | 11/2023 | Sun | |
| 2005/0265792 A1 | 12/2005 | Lee et al. | |
| 2005/0286980 A1 | 12/2005 | Hilfiker | |
| 2006/0204342 A1 | 9/2006 | Hilfiker et al. | |
| 2007/0251144 A1 | 11/2007 | Cooley | |
| 2010/0095586 A1 | 4/2010 | Sichello | |
| 2010/0146150 A1 | 6/2010 | Bamba | |
| 2010/0325953 A1 | 12/2010 | Chang | |
| 2011/0025704 A1 | 2/2011 | Odland et al. | |
| 2011/0146150 A1 | 6/2011 | Lyon | |
| 2011/0252704 A1 | 10/2011 | Cho | |
| 2011/0311318 A1 | 12/2011 | Taylor | |
| 2012/0087742 A1 | 4/2012 | Ogorchock | |
| 2012/0087743 A1 | 4/2012 | Dueck | |
| 2012/0272573 A1 | 11/2012 | Hashimoto | |
| 2013/0206714 A1 | 8/2013 | Pedersen et al. | |
| 2013/0333286 A1 | 12/2013 | Billingsley | |
| 2014/0100854 A1 | 4/2014 | Chen et al. | |
| 2015/0026579 A1 | 1/2015 | Vaya | |
| 2015/0265792 A1 | 9/2015 | Goudra et al. | |
| 2016/0050856 A1 | 2/2016 | Shah | |
| 2016/0262316 A1 | 9/2016 | Woolbright | |
| 2017/0138013 A1 | 5/2017 | Woolbright et al. | |
| 2018/0206414 A1 | 7/2018 | Goodman et al. | |
| 2018/0295791 A1 | 10/2018 | Calle et al. | |
| 2019/0150373 A1 | 5/2019 | Calle et al. | |
| 2020/0248426 A1 | 8/2020 | Palma | |

FOREIGN PATENT DOCUMENTS

| | | |
|---|---|---|
| EP | 2692225 A1 | 2/2014 |
| KR | 10-0650638 B1 | 11/2006 |
| WO | 2014/100854 A1 | 7/2014 |

OTHER PUBLICATIONS

U.S. Pat. No. 8,479,444 B2 (Mesiara) Jul. 9, 2013, Entire document.

U.S. Publication No. 2015/0265792 A1 (Lee) Dec. 1, 2005, Entire document.

"International Preliminary Report on Patentability received for PCT Patent Application No. PCT/US2019/056513, dated Apr. 29, 2021", 6 pages.

"International Search Report received for PCT Patent Application No. PCT/US2018/027942, dated Jul. 9, 2018", 2 pages.

"Fencer Wire, Heavy Duty 10 Gauge Galvanized Welded Wire Fence, 2" x 2" Opening Mesh for Vegetables, Garden Fruits & Animals Enclosure (4 ft. x 50 ft.)", Amazon.com, Feb. 24, 2021.

"Outdoor Living Walls: Ideas + Inspiration", INSTALLITDIRECT, Available online at: "https://www.installitdirect.com/learn/living-wall-decor-ideas/", Jun. 2, 2022, 9 pages.

"Terralink Soil Reinforcement Product", Global Synthetics, Available online at: "https://globalsynthetics.com.au/terralink-soil-reinforcement/", Retrieved on Nov. 30, 2023, 3 pages.

Amazon, "AgroSci Garden Wall Planter Kit for Outdoor Plants with Integrated Watering System, Modular Panels Mount as Vertical Garden Planter for Wall, Deck Rail or Fence, Black, 20 Pots 4 Frames", Available online at: "https://www.amazon.com/AgroSci-Planter-Integrated-Watering-Vertical/dp/B09NF4HTLC/ref=asc _?th=1", Dec. 10, 2021, 10 pages.

Youtube, "Steep Reinforced Soil Slope", Retaining Wall Expert, Available online at: "https://www.youtube.com/watch?v=VFF1RS8fPxU", Oct. 27, 2007, 4 pages.

* cited by examiner

EARTH WALL HAVING A POCKET STRUCTURE FOR RECEIVING VEGETATION AND METHOD FOR FORMING AN EARTH WALL

CROSS-REFERENCE TO RELATED APPLICATIONS

This application claims the benefit of and priority to U.S. Provisional Application No. 62/486,187, filed on Apr. 17, 2017, the disclosure of which is incorporated herein by reference in its entirety.

BACKGROUND

Creating earth walls can promote efficient land use. For example, in commercial or residential construction, an earth wall can create useable land from a steep slope. In road excavation, an earth wall can be efficient use of land. In landfill construction, an earth wall can increase the useable landfill volume.

For short residential walls under three or four feet high, interlocking blocks alone, such as those sold through home centers, are sufficient in many circumstances. Walls of this type are referred to as gravity walls.

For higher walls or for commercial or industrial uses, an earth wall is typically created by installing horizontal sheets of a primary reinforcement fabric that extend from near the front face into the earth for several feet or dozens of feet, depending on the parameters of the site, such as total wall height desired, soil conditions, toe slopes, anticipated surcharges, and the like. And a secondary reinforcement fabric is installed at the front face of the wall in a C-shape (in vertical cross section) to wrap the front face of the earth wall. Primary reinforcement fabric tends to be chosen for its tensile strength. Secondary reinforcement fabric may also require resistance to sunlight and other ambient environmental conditions.

Long wire mesh "baskets" or L-shaped structures are installed such that one leg of the basket is horizontal and in contact or near the primary reinforcement fabric and an adjoining leg of the basket is at the vertical front face of the earth wall. The weight of the fill puts a vertical downward force on the lower leg of the L-shaped unit. Typically, the wire mesh is installed in front of the secondary reinforcement fabric (that is, the fabric is relatively inward toward the earth and the wire mesh is relatively outward toward the ambient).

Typically, the primary reinforcement and secondary reinforcement fabrics and wire mesh are installed together and the earth is compacted to form a layer. Then another layer of primary and secondary reinforcements and wire mesh is installed on top of the first layer, but longitudinally offset or tiered relative to the layer below it. The tiered or step-like structure includes a nearly vertical face and a nearly horizontal step. Some specifications are written to request vegetation on the front face of the wall.

Conventional earth wall structures are commonplace across all construction sectors including commercial, residential, industrial, transportation, educational, energy, among others. Tens of millions of square feet of walls and steepened slopes of all types are used to level grades for new roadways, parking lots, and building pads for various uses. And there are many different types of systems and facing options that make up the "vertical earth" category. A wall formed from baskets of L-shaped units, reinforcement fabric, fill, and (optionally) vegetation is one example of vertical earth structures.

Vegetation provides a "cooling" effect in the environment and manmade materials such as steel, concrete, and pavement can create a "heating" effect. Green roofs have proven to be popular and if plantable, a green wall generally provides a softer, cooler feel and could become equally popular in reducing the carbon footprint of a newly constructed project.

Welded Wire Face Reinforced Soil Slopes (RSS) have become commonplace as a cost effective vertical retaining wall option. Once considered "temporary" by design and heavily used by State and Federal Department of Transportation (DOTs), this system type is often now considered for use as "permanent" structures in both public and private development. A few key elements that allow engineers to design WW RSS structures for permanent use include hot dipped galvanized face baskets and struts, UV stabilized turf reinforcement facing, and then vegetation, such as grass or vine for permanent aesthetic appeal and facial erosion stability.

SUMMARY

According to a first aspect, welded wire facing element of a RSS system provides a reliable and dimensionally accurate framework for permanent vegetation upon application of the pocket structure disclosed herein. A pocket structure for installing in an earth wall includes pocket sidewalls that are adapted for receiving a containerized vegetation; a hook surface adapted for attaching the pocket sidewalls to a reinforced soil structure wire; and a liquid receiver adapted for receiving liquid from an irrigation system. The reinforced soil structure preferably is a wire mesh, but other structures are contemplated, as the pocket structure has uses outside of wire mesh RSS applications.

Preferably, the hook surface is formed on a hook or pair of hooks that are integrally formed with the pocket sidewalls and are adapted to snap onto a wire. The hook surface may also be a separate clip, cable tie, or other mechanism for installing and holding the pocket structure on or against the wire mesh or other structure. The sidewalls may form forward-most edges of the upper and bottom walls to form a front face, which preferably is planar, and is configured to contact the wire mesh when hung or applied to the wire mesh. The liquid is typically water from an irrigation system, and encompasses water having a liquid-soluble fertilizer and/or other additives. The pocket structure may also include a retainer, such as tabs or a pocket, for holding fertilizer, such as a fertilizer tablet.

The pocket sidewalls preferably include a bottom wall and an opposing upper wall that in the installed position preferably have a rearward or downward sloped orientation. Plants that are inserted into the pocket preferably are in a container (preferably a biodegradable container, commonly referred to as a peat pot) and the sloped orientations (especially when a tapered peat pot is installed in the pocket) enable gravity to hold the plant in the pocket structure. In this regard, one or both of the bottom and upper sidewalls may be each sloped. Preferably, the walls include openings suitable for roots to grow through, except where a drip channel is formed. Thus, the terms "sidewall" and "walls" are used broadly to refer to a shell that is suitable for holding a plant or plant container in any way.

The liquid receiver can include a drip channel and a boss for receiving irrigation water and/or a fitting for connecting to the irrigation tube. Preferably, the drip channel is a groove formed in the underside of the upper wall. The term "drip channel" is used broadly herein to refer to a groove, tube, and like structure for transmitting liquid. Preferably, the upper wall when installed slopes rearward (that is, is angled at an acute angle relative to the horizontal) to facilitate rearward irrigation water flow via the drip channel to irrigate the plant within the pocket. Thus, the upper wall preferably is dimensioned relative to the intended plant container dimensions such that the upper surface is spaced apart from the plant container such that the plant container does not interfere with water flow through the drip channel.

The pocket sidewalls can include left and right sidewalls coupled between the bottom wall and the upper wall, and a rear wall coupled to the left and right sidewalls. Thus, the bottom wall, the upper wall, the sidewalls, and the rear wall can define a unitary structure. When intended for use with a tapered plant container, the upper wall and bottom wall may be mutually tapered, and the left sidewall and upper sidewall may be mutually tapered (that is, each surface wall is tapered relative to a longitudinal centerline of the pocket structure). The unitary pocket structure may be formed by one of an injection molded plastic, a metal sheet metal, or a wire fabrication.

The pocket structure can be configured to be installed behind a wire mesh and sized relative to the wire mesh opening such that the pocket structure is retained by the wire mesh. The pocket structure may be sized to be smaller than the opening in the wire mesh, and/or the pocket structure may include peripheral tabs adapted to prevent the pocket structure from passing through openings in the wire mesh.

In another aspect, an earth wall system suitable for growing vegetation on its front face can include a wire mesh having an opening in its front face; a reinforcement fabric having a portion that is vertical and proximate the wire mesh front face; a pocket structure of the type described herein, vegetation that is located in the pocket structure; and irrigation tubing having an outlet proximate the poi outlet of irrigation tubing, and can include a fitting head located above the pocket structure that is connected to the irrigation tube. The reinforcement fabric preferably is a primary and/or secondary reinforcement fabric, preferably in a "face wrap" configuration, as will be understood by persons familiar with RSS or earth wall technology.

As explained above, the pocket structure can be tapered and installed on the backside of the wire mesh, and held to the wire mesh by one or more hooks such that a front face of the pocket contacts the backside of the wire mesh. A lower wall of the pocket structure can be angled rearward such that gravity aids in holding the peat pot in the pocket. The upper wall of the pocket structure is angled rearward such that gravity aids in moving water rearward (via surface tension). The system can include irrigation tubing runs along the wire mesh to a drip fitting that is located above or in the boss receiver of the pocket structure such that water from the fitting flows into the drip channel via the receiver. The vegetation can be in a peat pot or like container located in the pocket.

The pocket structure can be tapered at approximately the same angle as the angle of corresponding peat pot size, and the pocket is sized such that the upper wall of the peat pot (when installed) is spaced apart from the drip channel by between 0.125 inches and 0.75 inches. A fertilizer tablet (or other fertilizer component) can be retained in the pocket, preferably located at the rear of the pocket and located relative to a drip channel (described above) such that water from the drip channel contacts the fertilizer to feed the vegetation.

The earth wall system can be packaged for shipping. Thus, another aspect of the present invention is an earth wall system kit comprising L-shaped wire mesh units, irrigation tubing, pocket structures described herein, and drip fittings that are packaged together on a pallet. In this regard, the wire mesh units can be between 24 inches long so as to fit onto a 4×4 pallet. At least some of the mesh units in the package are oriented vertically, such that the wire mesh units can support the weight of another pallet of pre-packaged wire mesh units, irrigation tubing, pocket structures described herein, and drip fittings. Preferably, the wire mesh units are 12 inches high.

A method of forming an earth wall includes the steps of: installing a wire mesh (such as an L-shape unit or basket) on an earth surface; installing a pocket structure of claim 1 on one of the wires of the wire mesh (preferably an upper one of the horizontally oriented wires and preferably via hooks on the pocket structure) by engagement of the hook surface with the wire mesh, preferably such that the pocket structure is on the backside of the wire mesh; installing primary and/or secondary reinforcement fabric and installing earth fill on or in the fabrics; installing vegetation (such as a grass or vine, preferably in a peat pot) into the pockets of the pocket structures; and installing irrigation tubing having a drip head aligned with the pocket structure.

The step of installing the wire mesh units is repeated to form a longitudinal wall of wire mesh units, and pocket structures are installed at predetermined intervals along the longitudinal wall. The irrigation tubing is also installing longitudinally and affixed to the pockets via the fitting in the boss, attached to the wire mesh, or both.

DESCRIPTION OF SOME PREFERRED EMBODIMENTS

Figure 1:
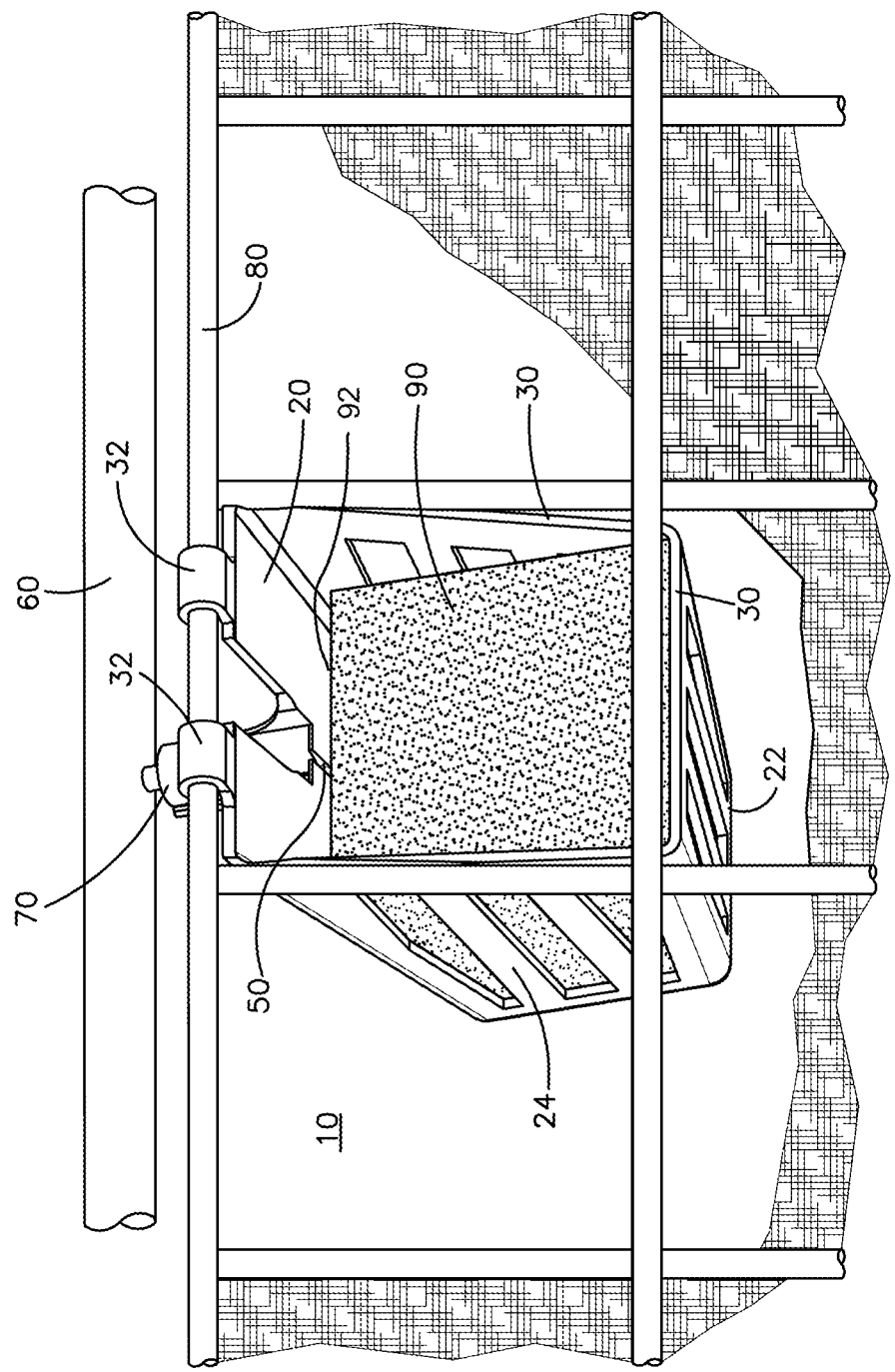
FIG. 1 is a top perspective view of a portion of components of an earth wall structure.
Figure 2:
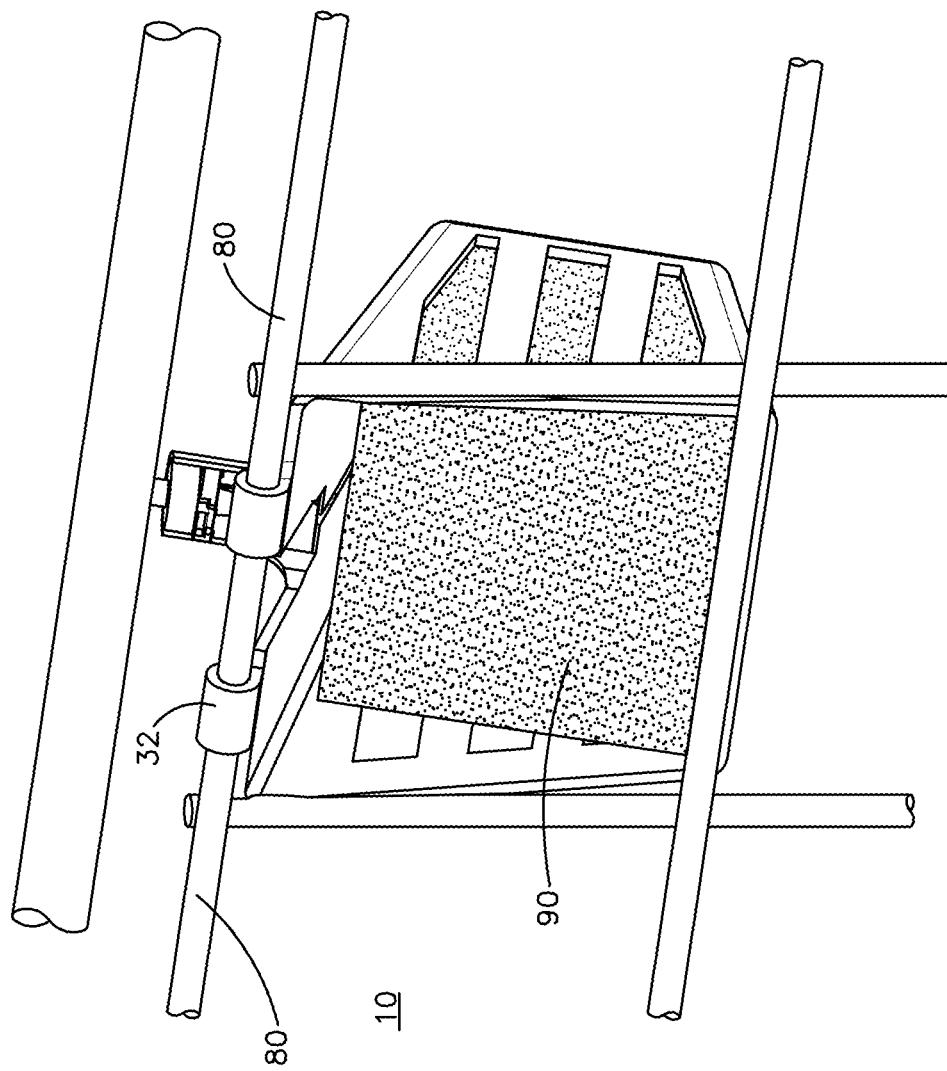
FIG. 2 is another perspective view of the structure of FIG. 1.
Figure 3:
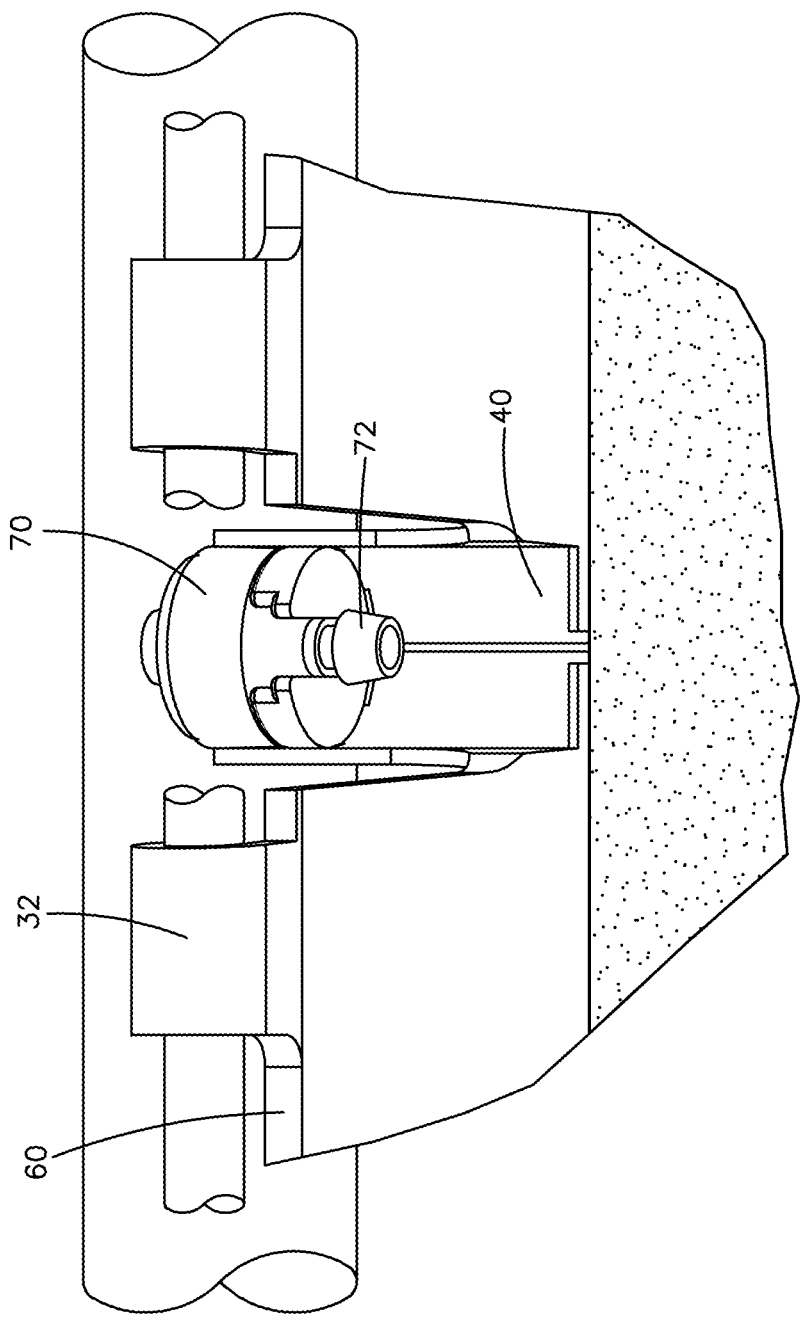
FIG. 3 is an enlarged view of a portion of the structure of FIG. 1.
Figure 4:
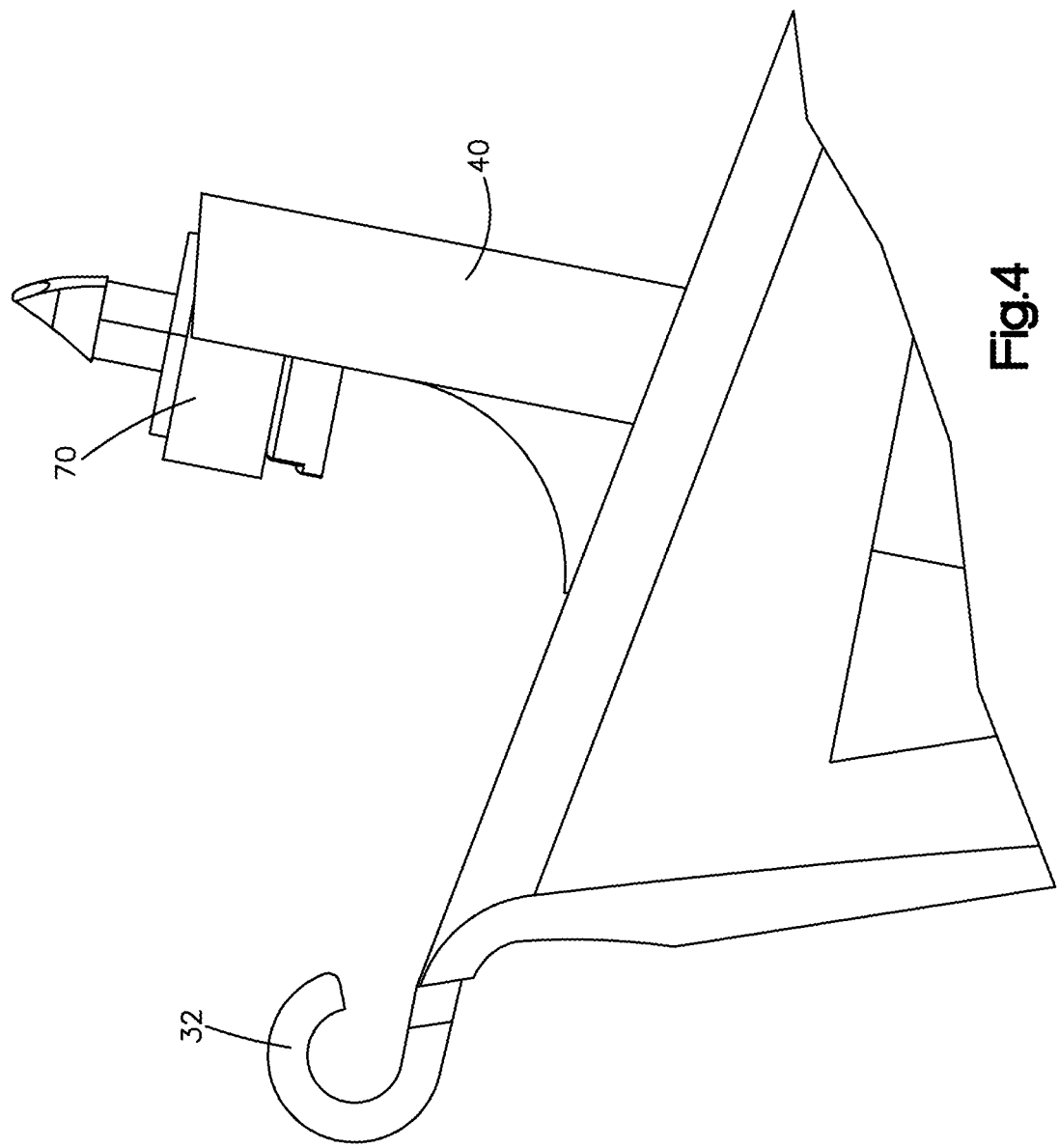
FIG. 4 is a side view of the pocket structure and drip irrigation fitting assembly.
Figure 5:
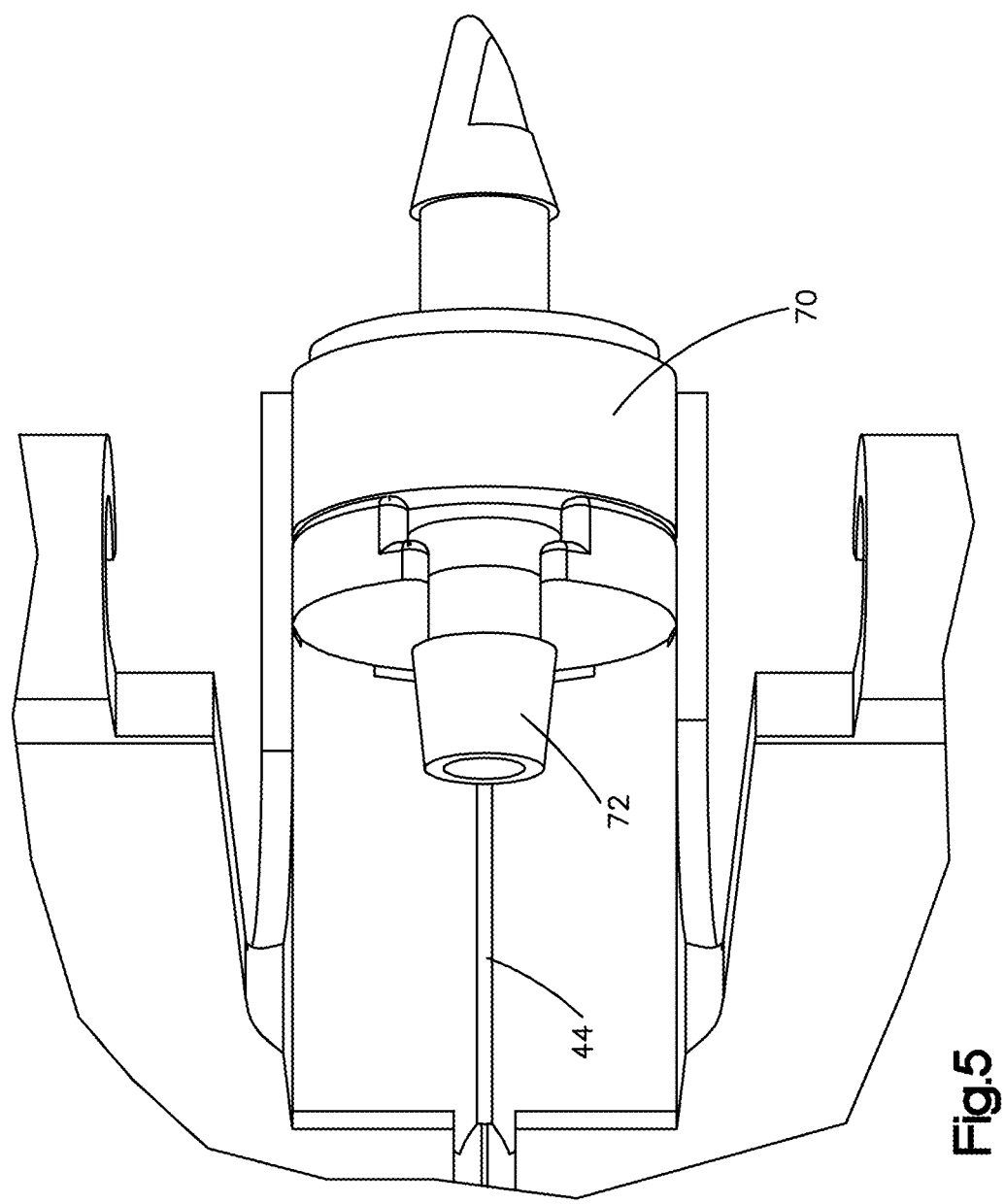
FIG. 5 is an enlarged view of a portion of the assembly of FIG. 4.
Figure 6:
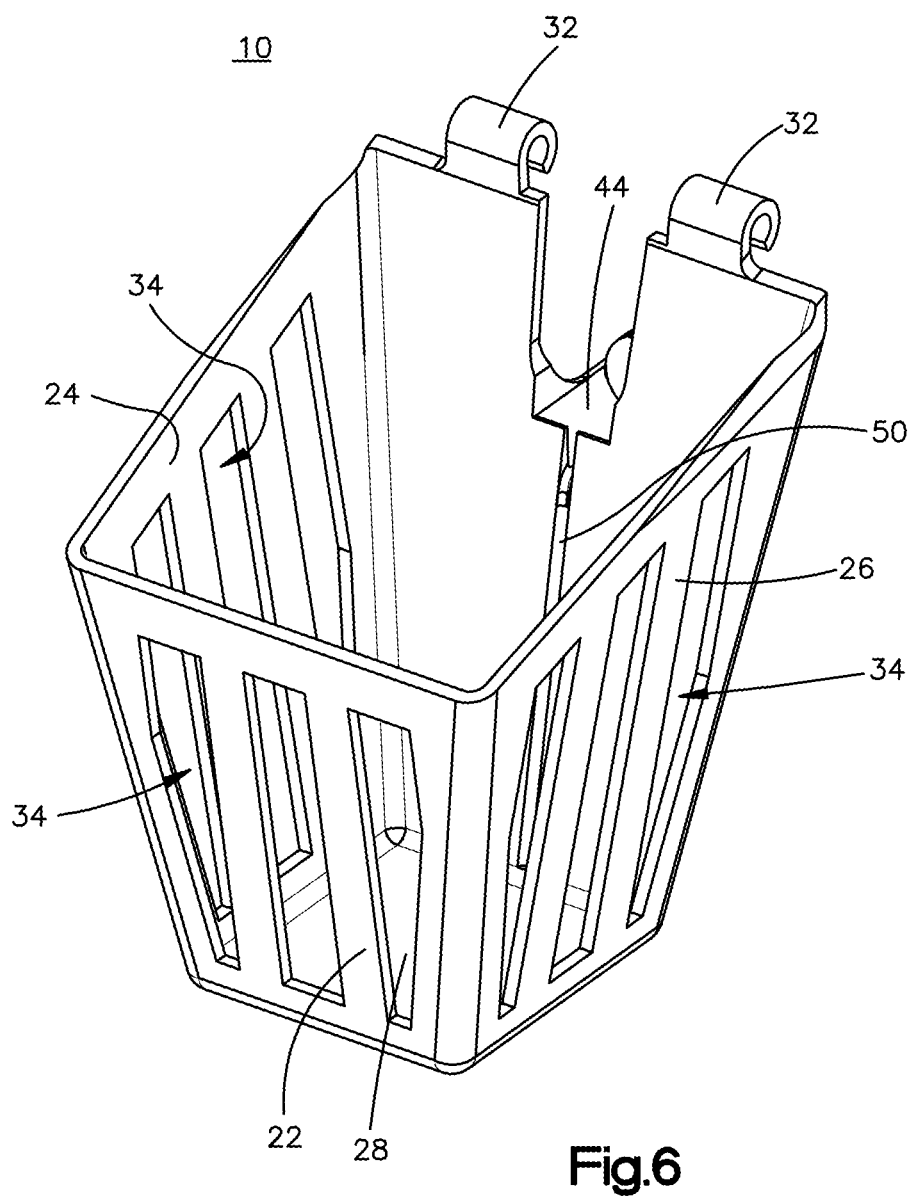
FIG. 6 is a perspective view of the pocket structure.
Figure 7:
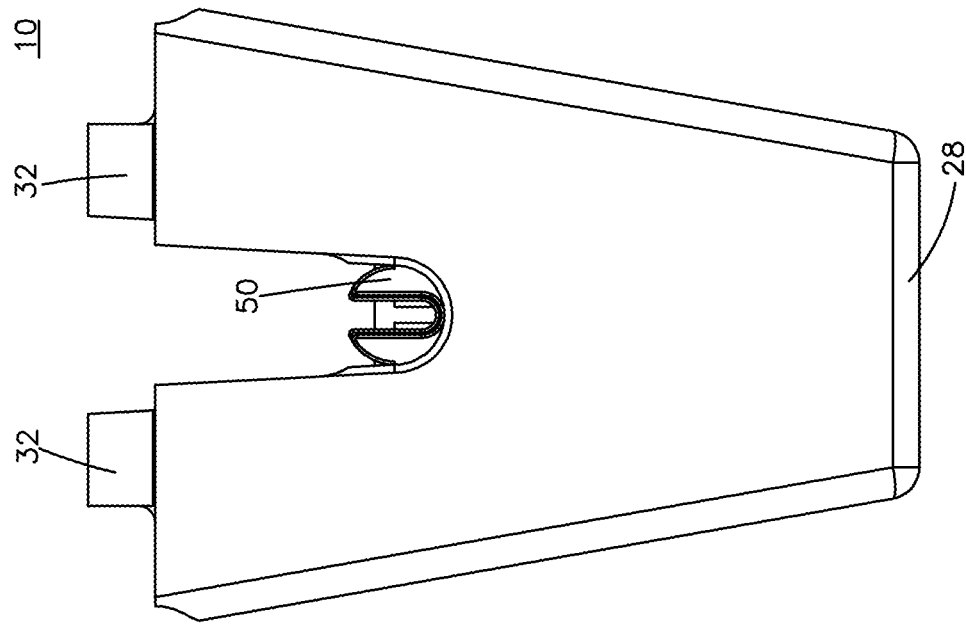
FIG. 7 is another perspective view of the pocket structure.
Figure 8:
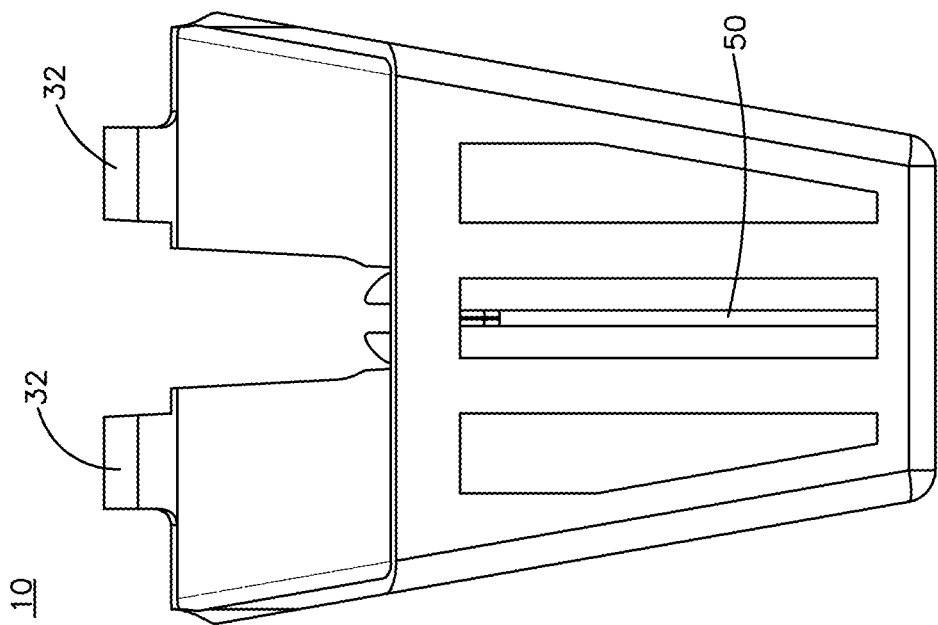
FIG. 8 is a view of the pocket structure of FIGS. 6 and 7.
Figure 9:
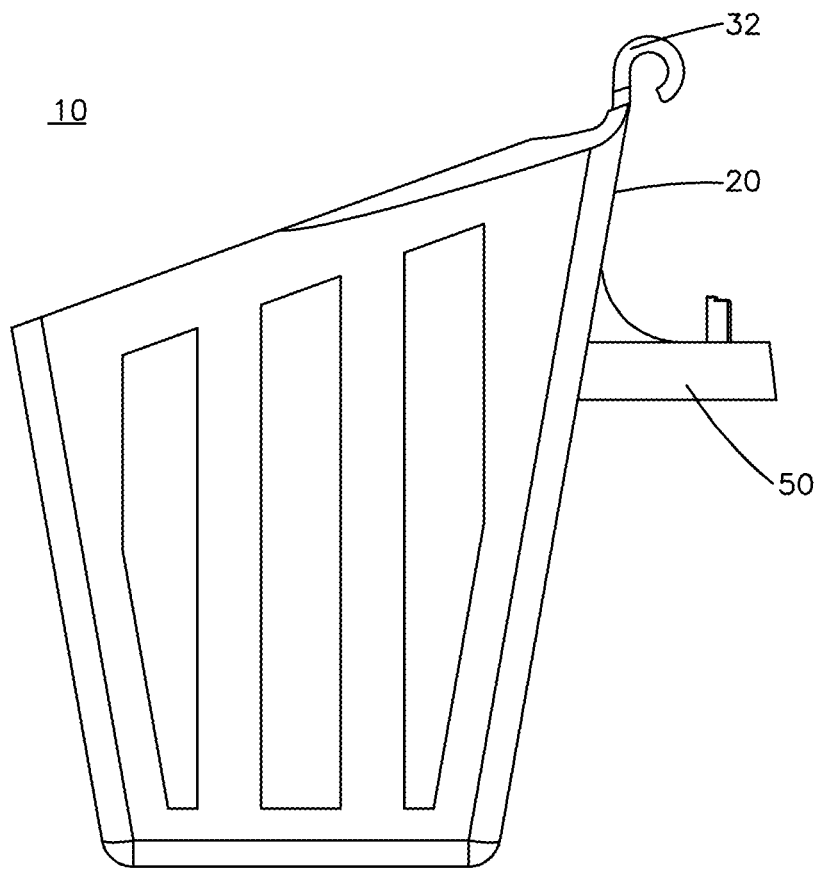
FIG. 9 is a side view of the pocket structure of FIGS. 6 and 7.
Figure 10:
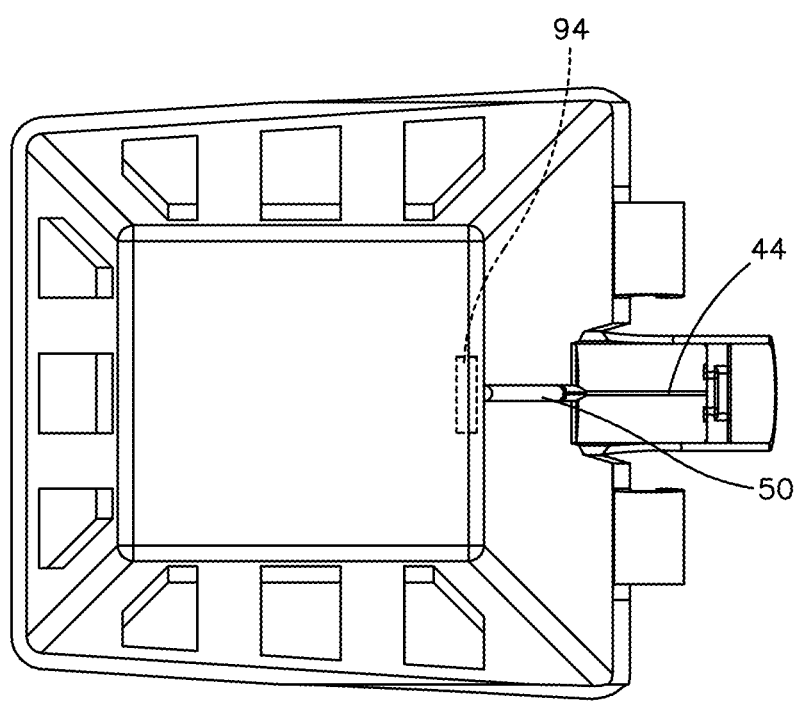
FIG. 10 is a front view of the pocket structure of FIGS. 6 and 7.

Referring to the FIGS. 1 through 10 to describe an embodiment of one aspect of the present invention, a pocket unit or pocket structure 10 is a unitary object that forms an enclosed, tapered, open-topped enclosure for holding plants, especially a container 90 having a plant. Pocket structure 10 includes four sidewalls: an upper wall 20, a lower wall 22, and left and right sidewalls 24 and 26. Upper wall 20 and lower wall 22 are named according to their orientation while installed in a wire mesh or like structure, and the orientations of "upper" and "lower" are merely for convenience of description.

The term "earth wall" is herein as generally used in the commercial landscaping industry, and is used broadly to refer to walls, slopes, and like structures.

Figure 11:
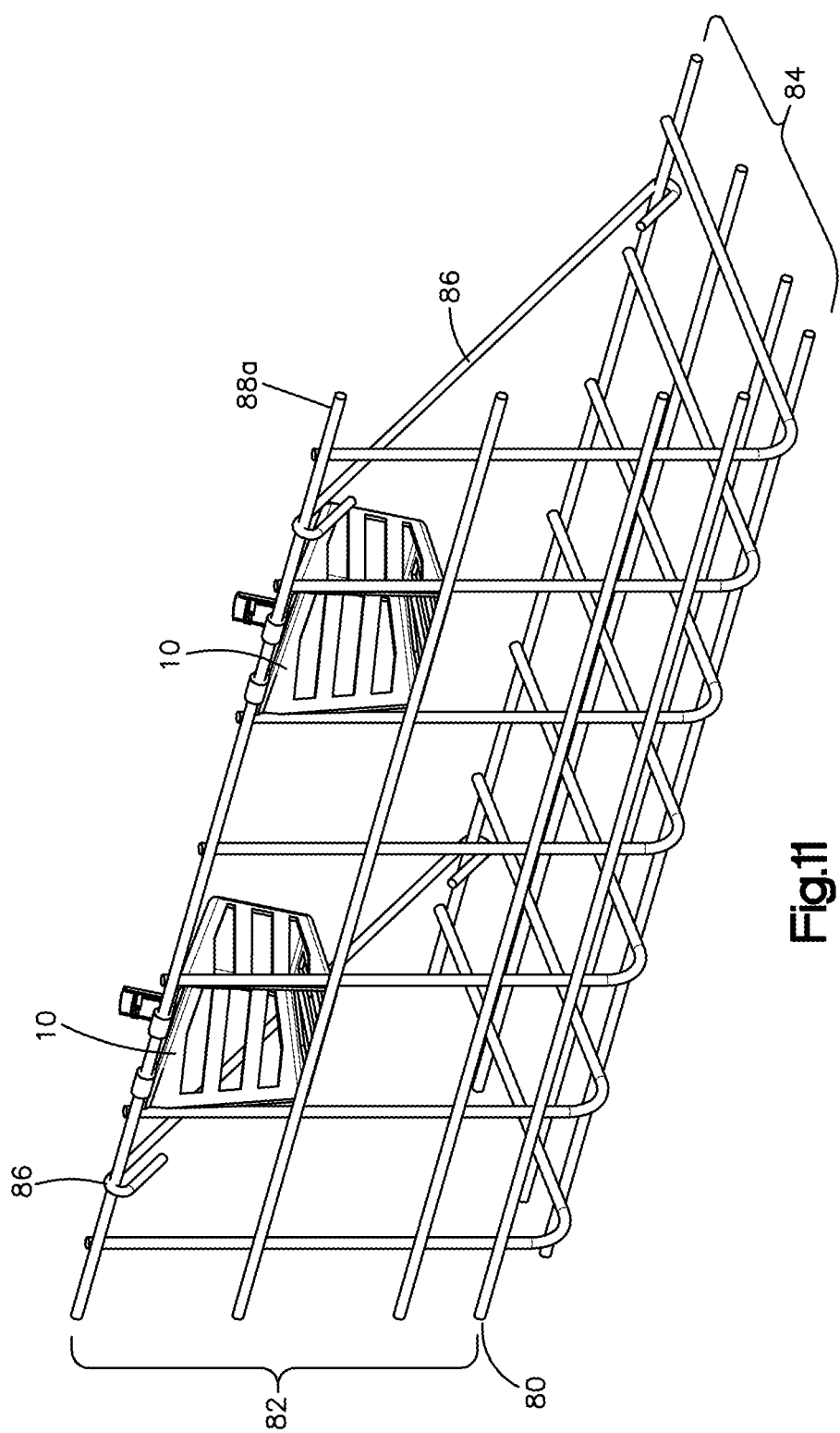
FIG. 11 is a top, front perspective view of a pocket structure mounted on a wire mesh basket.
Figure 12:
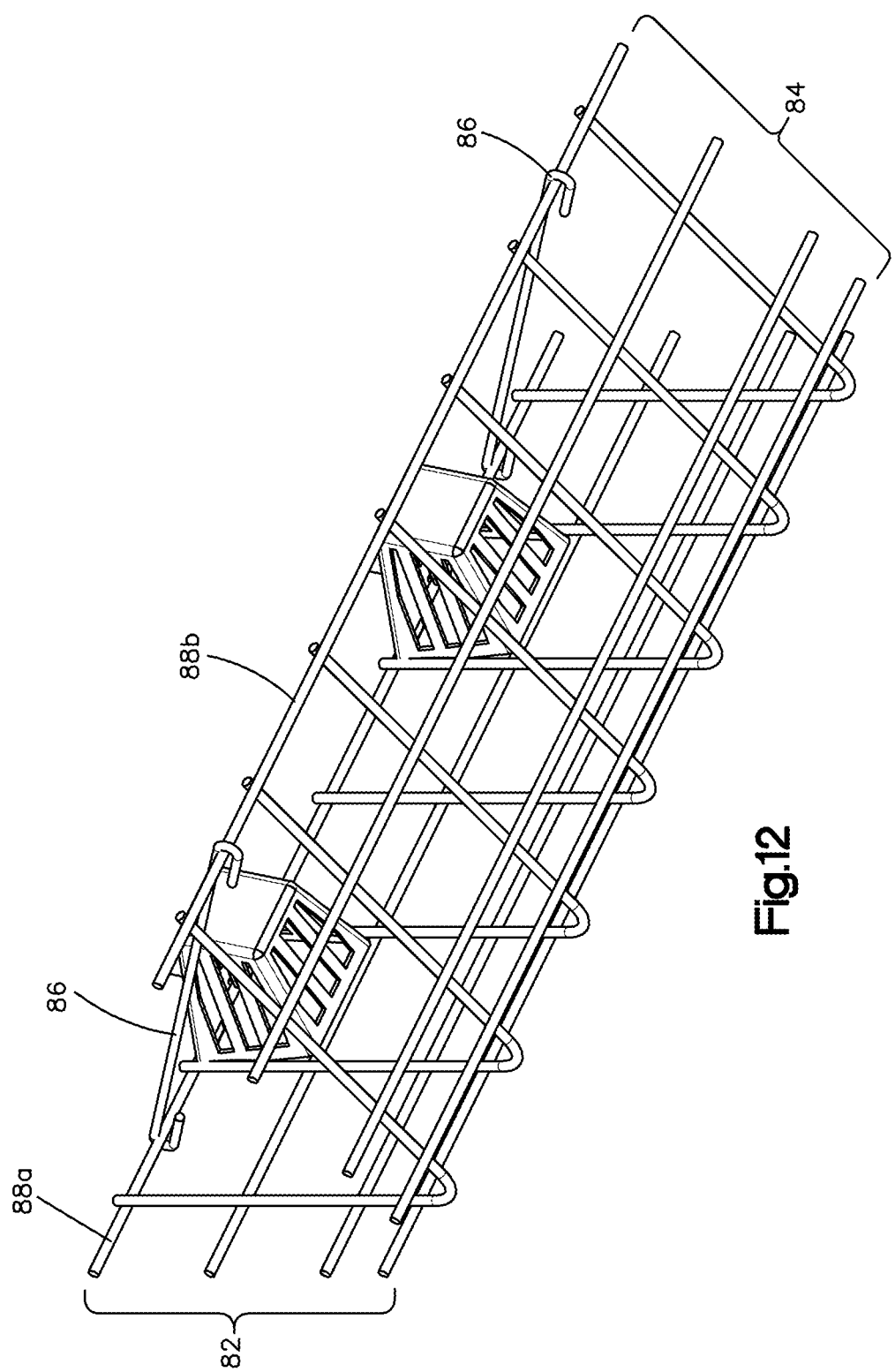
FIG. 12 is a bottom, rear perspective view of the structure of FIG. 11.
Figure 13:
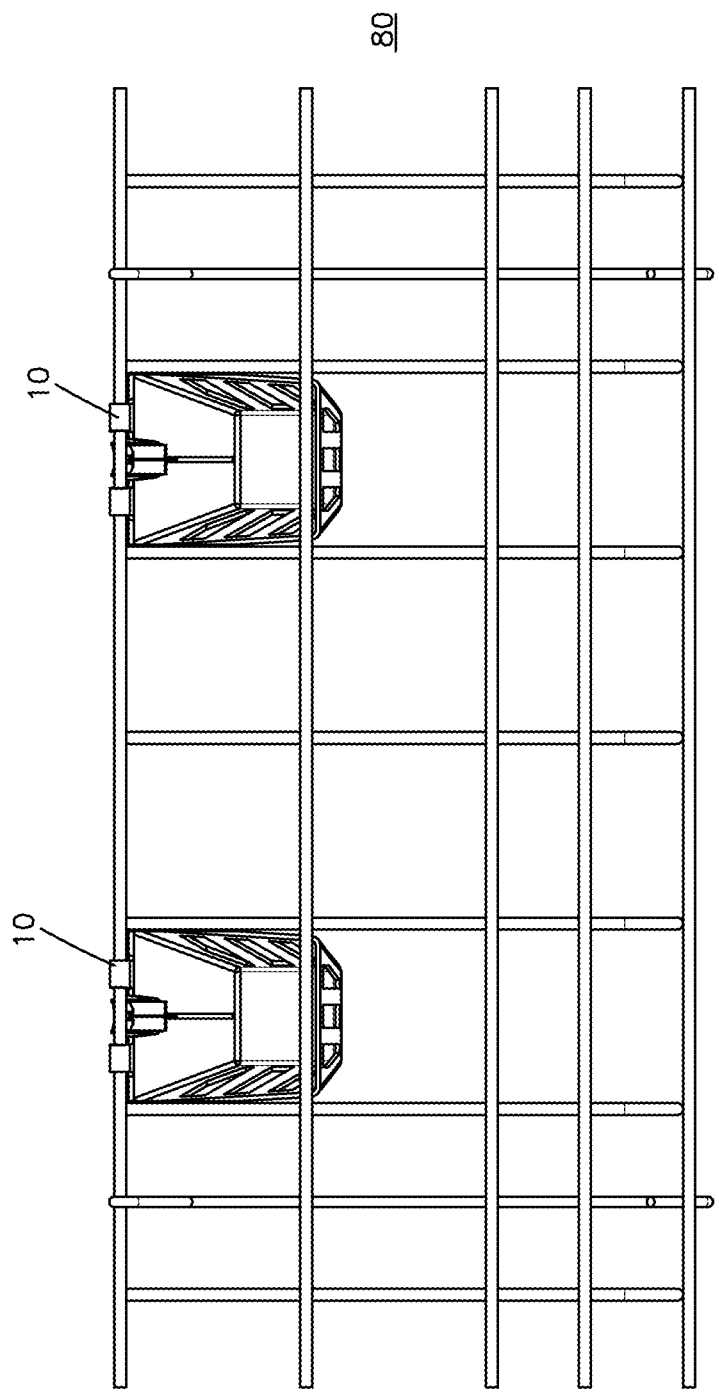
FIG. 13 is a front view of a of the structure of FIG. 11.
Figure 14:
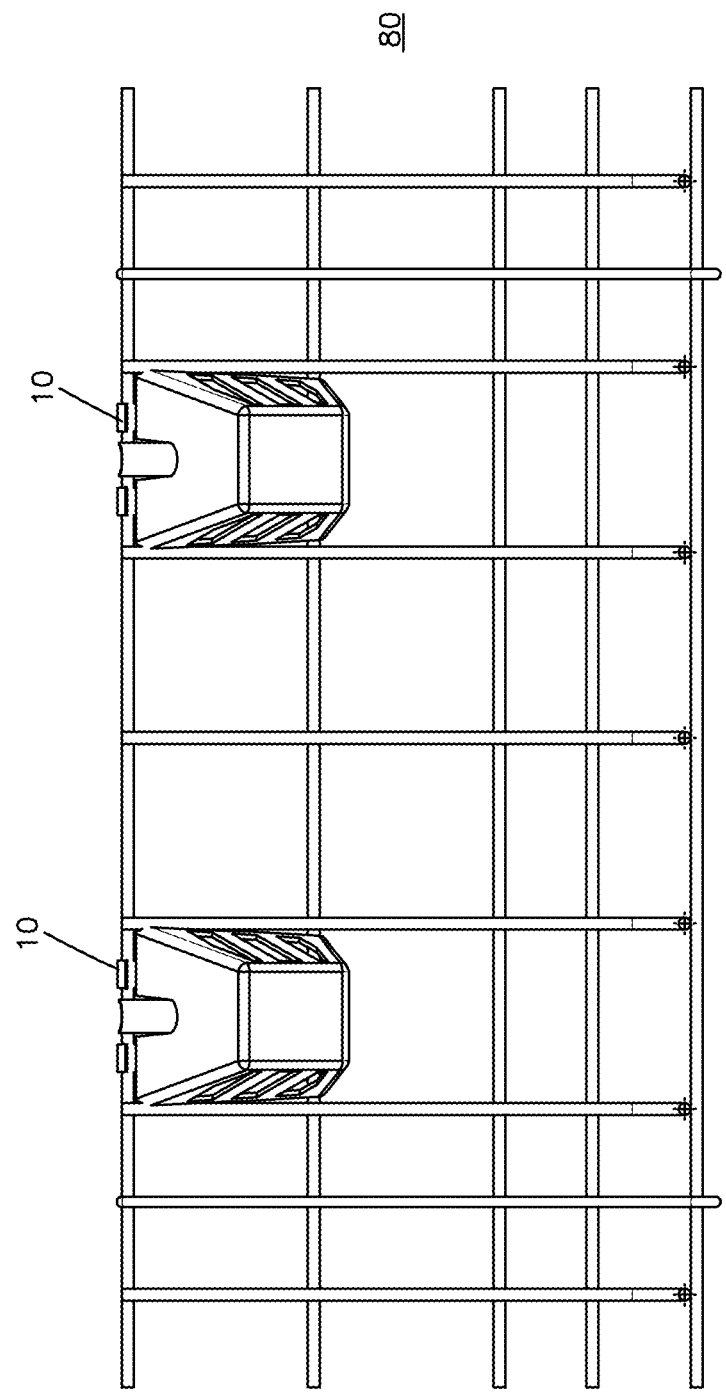
FIG. 14 is a rear view of the structure of FIG. 11.
Figure 15:
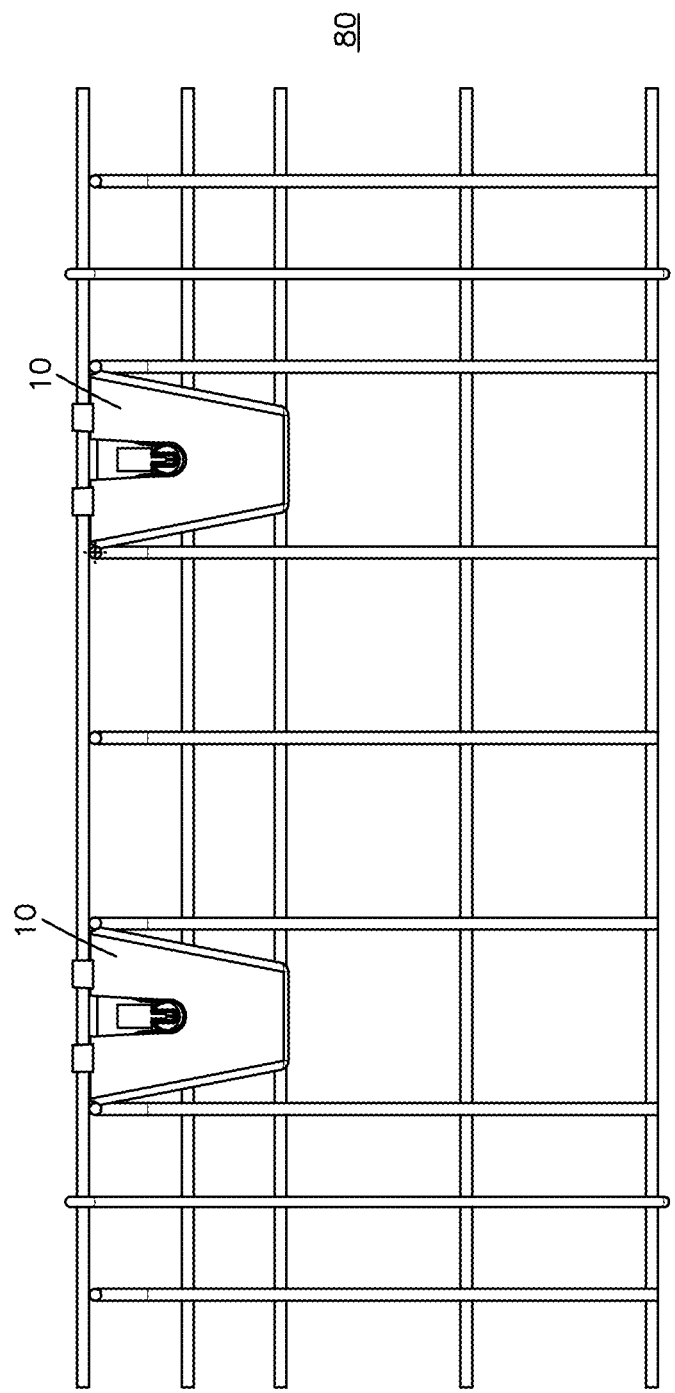
FIG. 15 is a top view of the structure of FIG. 11.
Figure 16:
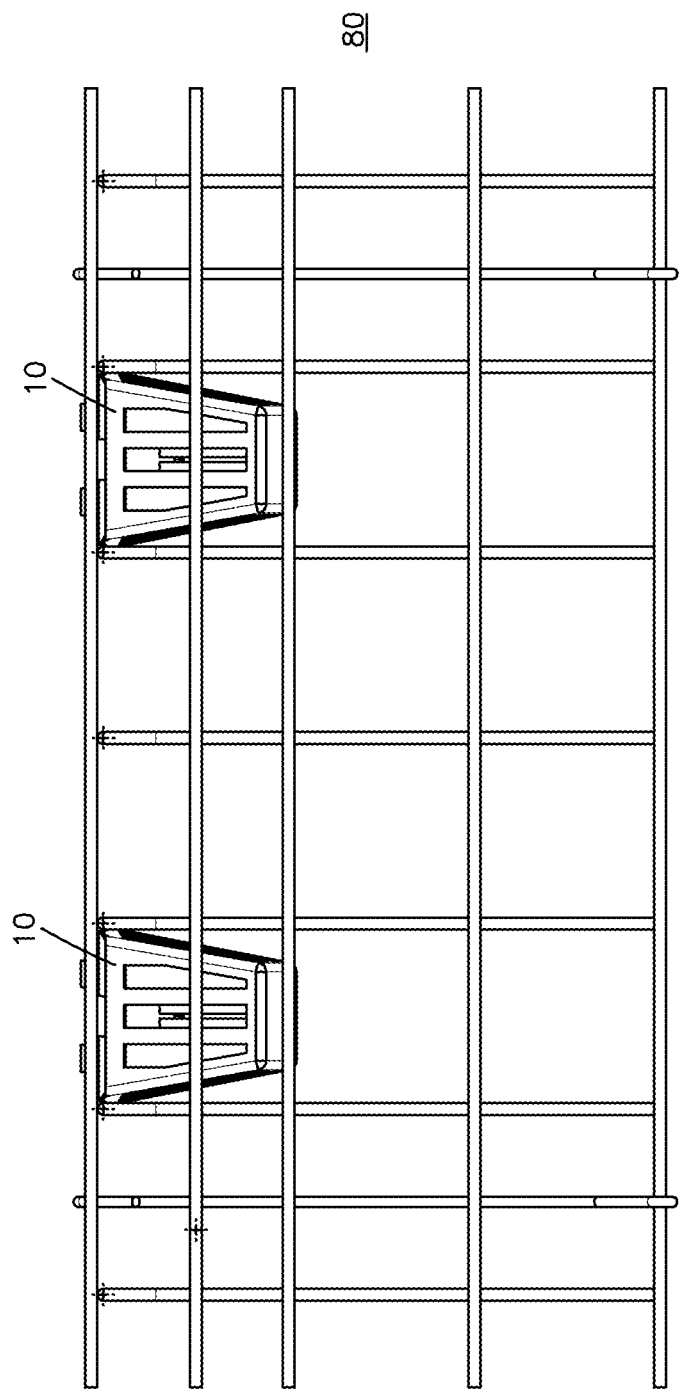
FIG. 16 is a bottom view of the structure of FIG. 11.

Walls 20, 22, 24, and 26 form a square or rectangular shape, in transverse cross section, which can be chosen according to the configuration of a container 90 that is intended to be used with pocket 10. Alternatively, the sidewall may be curved, such that the transverse cross-section of the pocket structure is a circle, oval, or the like, such that the pocket has a cylindrical or frusto-conical shape, which shape may be useful when using cylindrical or conical plant containers, or plants without containers. A rear wall 28 is joined to the lower ends of walls 20, 22, 24, and 26. Pocket structure 10 is oriented such that the rear wall 28 is opposite a wire mesh 80, as illustrated in FIG. 11. As illustrated in the figures, bottom wall 22 and sidewalls 24 and 26 include openings 34, which are slots in the embodiment of the figures, through which roots from the plants may grow through. In this regard the walls can be referred to as open.

A top or forward-facing portion of the walls 20, 22, 24, and 26 form a front face 30, which as described below, can contact the wire mesh basket 80. A pair of hooks 32 extend from upper wall 20. Hooks 32 are configured to open rearwardly such that pocket structure 10 is mounted from the backside of mesh basket 80. Preferably, the hooks and wire mesh are sized such that the hooks snap onto the wire mesh (such as having a curved or circular profile having a structure that makes up greater than 180 degrees, or other retaining structure). Thus, pocket structure 10 hangs (preferably securely) on a horizontal wire of basket 80 with portion of face 30 contacting a face of wire basket 80. The term "hook surface" is employed to encompass hook 32 and other mechanisms for attaching a pocket structure to a wire mesh, including but not limited to a clip, crimping, tie (such as a cable tie), and the like fasteners. In embodiments in which a wire mesh is not used, the pocket structure may omit a hook altogether.

A liquid receiver, such as a boss 40, is formed on the upper wall 20, for receiving a drip emitter fitting 70. Boss 40 can take the shape of the intended drip fitting, and in the embodiment of the figures is a curved, or partial-cylinder shape to match the disk-like shape of fitting 70. Fitting 70 preferably is a conventional drip irrigation head. Fitting 70 includes a fitting inlet 72, which includes a barb for piercing an irrigation tube 60 that extends along the face of the reinforce soil structure. Irrigation tube 60 and fitting 70 may be of the type used in commercial or residential lawn and vegetation irrigation systems, such as supplied by Rain Bird or other commercial suppliers. Upper wall 20 includes a drip channel feed 44, which can be a curved surface of the boss 40, and in the figures is illustrated by a channel 50 in the boss 40 that runs to the underside of upper wall 20.

A drip channel 50 is a groove in the underside of upper wall 20 that runs longitudinally (that is, front to back) and is connected to channel feed groove 44 such that water from irrigation tube 60 moves through fitting 70, into channel feeder 44, and via surface tension down the sloped underside of wall 20 in drip channel 50. Thus, irrigation water can supplied deep (that is, in a direction into the wall) to the plants in pocket structure 10. Tabs or a pocket 94 preferably are located on the underside of wall 20 and in-line with drip channel 50 to hold a fertilizer pellet or tablet to fertilize root system of the vegetation within pocket structure 10, at least upon initial installation. Reference number 94 is employed to refer to both the tablet and the tabs for holding the tablet, which structure may be located in a pocket on the underside of wall 20, as illustrated in dashed lines (as the tablet will eventually dissolve) in FIG. 10.

In its installed position, such as shown in FIG. 1, upper wall 20 is sloped downwardly (relative to horizontal) and rearwardly, which slope enables gravity to move water via drip channel 50. The slope of upper wall 20, the shape and size of drip channel 50, and the design flow rate of irrigation water can be chosen together as design parameters, as will be understood by persons familiar with conventional irrigation technology in view of the present disclosure. The slope of upper wall 20 may also be chosen together with the slope of lower wall 22 and the shape and dimension of container 90, as it is preferred that lower wall 22 slope downwardly and rearwardly such that the container 90 rests within pocket structure 10 by gravity. Container 90 is partially shown in FIG. 1, and preferably is spaced apart from upper wall 22 by a gap 92 to promote drip irrigation flow, as explained below. Any type of engineering plastic may be used for forming pocket structure 10 that is suitable for ground contact and (optionally) exposure to sunlight.

Any type of plant, such as an annual, perennial, grass, vine, or other vegetation, may be used. The plants preferably are in a container 90, such as peat pot in a conventional size—for non-limiting example, 2.25 inches square and 2.25 inches deep, 3 inches square and 3 inches deep, 3.5 inches square and 3.75 inches deep, 4.25 inches square and 3.5 inches deep, 5.5 inches tall and 3.5 inches deep. The dimensions of pocket structure 10 are then chosen accordingly to achieve the structure and function described herein.

FIGS. 11 through 16 illustrate an embodiment of wire mesh unit 80, which includes a front face 82, a rearwardly extending lower leg portion 84, and braces 86. Preferably, lower leg portion 84 is perpendicular to front face 82. The individual wires are indicated by reference number 88. The uppermost horizontal wire, which is shown having two pocket structures 10 installed, is indicated by reference number 88a. The rearward-most wire is indicated by reference number 88b. Preferably, the front face 82 is configured to be installed such that is forms an angle with a vertical reference line between zero degrees and 12 degrees (measured opening rearwardly—this is, a positive angle opens to inboard side, facing the earth wall). The term "vertical" is used herein without limitation to any particular magnitude of angle; rather, "vertical" is intended to be used consistently with the understanding in the commercial landscaping industry.

Brackets 86 extend between front face 82 and lower leg 84, and as shown in the figures between uppermost wire 88a and the distal-most wire 88b of lower leg 84. Brackets 86 having hooks on each end for engaging wires 88a and 88b, as the forces applied by the soil tend to push portions faces 82 and 84 (angularly) apart. Thus, brackets 86 are primarily in tension when installed. Wire mesh units 80 are formed by manufacturing the wire mesh by well-known means, preferably of hot dipped galvanized steel, and bending the mesh sheet to form face 82 and leg 84. The materials, wire diameter, welding type, coatings, and other engineering parameters may be chosen according to the particular needs of the wall installation, such as total wall height desired, unit height, row set back dimensions, soil conditions, toe slopes, aesthetics, and the like.

Pockets 10 are hung from wire 88a and retained on the rear or backside of face 82. Preferably, pockets 10 and the mesh size opening of mesh unit 80 are sized such that pocket 10 has at least one dimension (that is, height or width) that is larger than the corresponding mesh opening dimension to retain pocket structure 10 on the backside of face 82. Also, tabs outboard of the sidewalls or bottom wall, or like structures can be used to prevent pocket structure 10 from inadvertently poking through the mesh opening of face 82. It is preferred that pocket structure 10 be located on the backside of face 82, and other configurations are contemplated in which a portion of a pocket protrudes forward relative to face 82.

Figure 17:
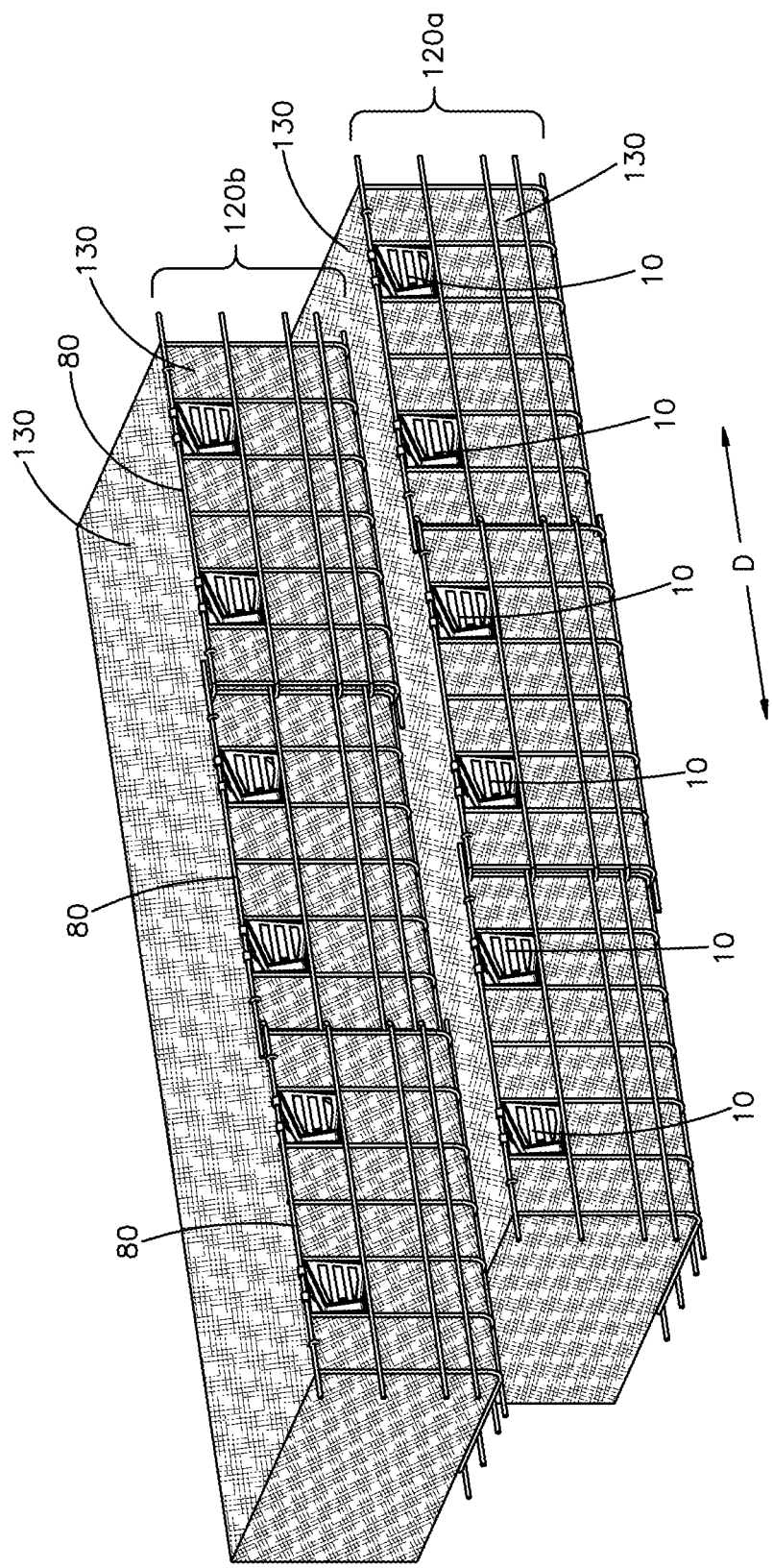
FIG. 17 is a perspective view of a vertical earth wall structure having two rows.
Figure 18:
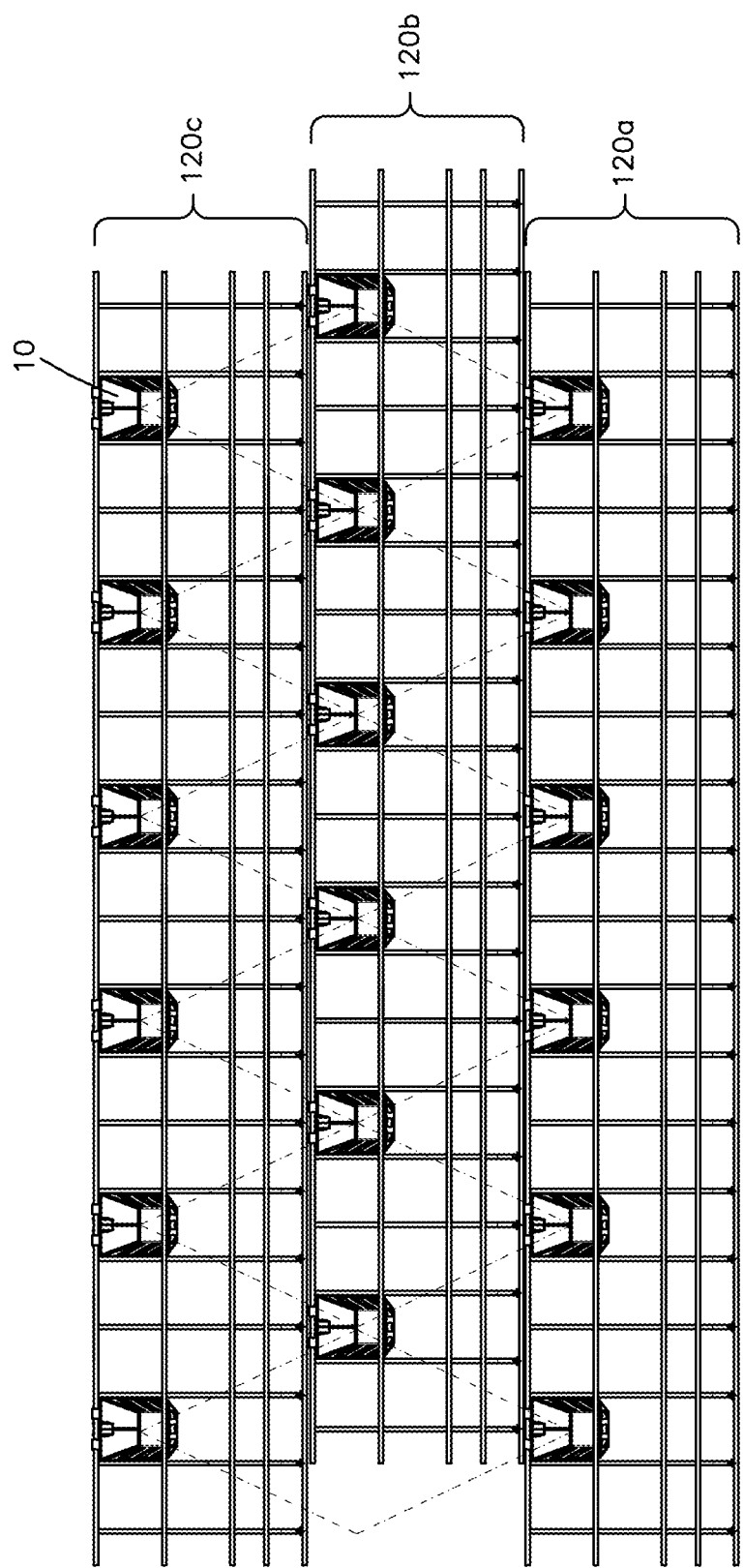
FIG. 18 is a perspective view of a vertical earth wall structure having three rows.

FIGS. 17 and 18 illustrate an earth wall 110 that includes two earth wall rows 120a and 120b. Each earth wall row 120 (the reference numbers without an appended letter are used to refer to structures generally) includes one or more layers of reinforcement fabric 130 arranged according the desired design of the site; multiple, aligned wire mesh units 80 across the front face of row 120; and multiple pocket structures 10, which are spaced at intervals chosen for the particular installation, according to know principles. Adjacent mesh units 80 can be attached together with wire clips or other means, such as opposing hooks formed the terminal ends of the wires 88 that can be engaged and mated when installing one unit 80 next to another. An irrigation tube 60 (not shown in FIGS. 17 and 18) runs along wire 88a.

Fabric 130 may include primary reinforcement fabric and/or secondary reinforcement fabric according to conventional parameters, preferably configured in a C-shaped (in vertical or transverse cross section). When both primary and secondary reinforcement fabric is used, the primary reinforcement fabric preferably extends into the earth at a distance greater than that of the secondary fabric. As illustrated, it is preferred that the fabric 130 be rearward or behind front face 82 of mesh unit 80.

In a particular embodiment, each wire mesh unit 80 is 24 inches long (that is, along dimension arrow D in FIG. 17) and 12 inches high and 12 inches deep (that is, surfaces 82 and 84 have a leg dimension of 12 inches) to promote stacking of the units 80 and packing on a pallet. In this embodiment, horizontal wires are spaced four inches apart both in face 82 and leg 84, and then two additional horizontal wires bisect the lower opening of face 82 and the front opening of leg 84. The configuration may also be considered to have two 4 inch spacings and two 2 inch spacings on the front face; and two 4 inch spacings and two 2 inch spacings on the front face. The two inches spacings are at about the bend to provide rigidity.

In this regard, at least some of the mesh units 80, such as the embodiment that is 24 inches long, can be oriented vertically such that the wire mesh units 80 can support the load of another pallet placed on top of the first pallet. Thus, each pallet or groups of pallets can pre-package the materials for forming an earth wall, including mesh units 80, pockets 10, and irrigation tubing 60. The pre-packaged wall system components are contrary to the industry wire mesh units, which typically are provided in longer lengths (often 10 feet long) and 18 inches by 18 inches (leg lengths).

As illustrated in FIG. 17, an upper row 120b is set back relative to a lower row 120a; faces 82 of mesh units 80 of upper row 120b are set back (that is, spaced apart to the rear) of faces 82 of mesh units 80 of lower row 120a. FIG. 18 illustrates three rows 120a, 120b, and 120c, with the locations of the pocket structures 10 in a diamond pattern.

The method of using pocket structures 10 and wire mesh units 80, and for forming an earth wall 110, as described above, includes laying wire mesh baskets 80 end to end on a prepared earth surface to desired final length (along dimension D) and fastening them together as needed. As explained above, faces 82 preferably are inclined between zero degrees and 12 degrees. Pocket structures 10 are installed at desired locations by engaging hooks 32 with wires 88a from the backside of wire mesh unit 80. In this regard, upon clipping hooks 32 on wire 88a, pocket 10 may drop into position such that front face 30 of the pocket 10 contacts the back side of wire mesh face 82.

Fittings 70 may be pre-assembled with pocket structure 10 or may be installed into boss 40 after pocket structures 10 are applied to wire mesh baskets 80. An irrigation tube 60 is run along the top of mesh units 80 and may be affixed to top wire 88a. Preferably, fittings 70 are joined to tube 60 by pressing the barb on the fitting 70 directly through the wall of tube 60. Other joining methods are contemplated.

Primary and/or secondary reinforcement fabric may be installed according to conventional practices at the appropriate time, and preferably is cut such that pocket structures extend through the fabric. As illustrated in the figures, the fabric preferably is installed on the backside of the wire mesh unit faces 82. Other locations of the fabric are contemplated. The term "reinforcement fabric" is used herein to refer to primary, secondary, and/or any type of fabric used in earth walls. Fill (such as soil) may be filled behind mesh units 80 and together with the fabric complete a row, such as row 120. In this regard, the weight of the fill anchors or secures wall 110, as the fill creates downward force on the lower legs of mesh units 80. At some point, vegetation in pots 90 is installed in each one of pocket structures 10 from the front side. As will be understood by persons familiar with earth wall technology, the above steps may be performed in any logical order. The above steps are repeated to form second row 120b, usually beginning with a desired set back distance, which is chosen according to known parameters, such as soil conditions, wall design, and the like.

Aspects of the present invention are disclosed herein using specific example of structure and function. The present invention is not limited to the particular structure and function disclosed in the text and drawings, as the structure and function of the embodiments are examples. Rather, the inventors intend that the scope of the invention be defined as set out in the claims. For non-limiting example, the pocket structure is described as receiving a container holding a plant, and specific configurations of the pocket structure, mesh unit, and a wall mesh units described. The invention is not limited by the size or shape of container, nor to even having a container at all, and the pocket structure, mesh unit, and wall are not limited to any configuration, unless stated in the claims.

The invention claimed is:

1. A pocket structure for installing in a Reinforced Soil Slope (RSS) earth wall, the pocket structure comprising:
   an opening adapted for receiving containerized vegetation;

pocket sidewalls including openings that are adapted for roots of the containerized vegetation to grow therethrough;

whereby the pocket structure is adapted to be located in soil fill of an RSS earth wall of the type formed by the soil fill, a wire of a face of the RSS earth wall, and reinforcement fabric, and wherein the pocket sidewalls include a bottom wall and an opposing upper wall, and wherein the pocket structure is configured such that upon installation, at least a portion of at least one of the bottom wall and the upper wall has a rearward slope such that when a tapered peat pot is installed in the pocket, gravity holds the peat pot in the pocket structure.

2. The pocket structure of claim 1 further comprising a hook surface adapted for attaching the pocket sidewalls to the wire, the hook surface is a formed on a hook that extends from the upper wall.

3. The pocket structure of claim 1 further comprising a liquid receiver adapted for receiving liquid from an irrigation system, the liquid receiver includes a drip channel adapted for transmitting liquid from an irrigation system rearwardly relative to the pocket structure.

4. The pocket structure of claim 3 further comprising a boss receiver for receiving water from an irrigation system, and wherein the drip channel is an inverted drip channel formed on an underside of an upper one of the pocket structure sidewalls, and wherein the boss receiver is configured such that water received by the boss receiver flows into the inverted drip channel.

5. The pocket structure of claim 4 wherein the pocket structure is sized to have an internal vertical height greater than a vertical height of a peat pot such that the peat pot is spaced apart from the underside of the upper wall so as not to interrupt water flow via the drip channel.

6. The pocket structure of claim 3, wherein the pocket sidewalls are a unitary structure that is formed by one of an injection molded plastic, a metal sheet metal, or a wire fabrication.

7. The pocket structure of claim 3 wherein the upper wall when installed slopes rearwardly to facilitate rearward water flow via the drip channel.

8. The pocket structure of claim 1 wherein the pocket sidewalls include left and right sidewalls coupled between the bottom wall and the upper wall, and a rear wall coupled to the left and right sidewalls, the bottom wall, and the upper such that the pocket structure is a unitary structure, and wherein the upper wall and bottom wall mutually taper, and the left sidewall and upper sidewall mutually taper.

9. The pocket structure of claim 1 further comprising a retainer for holding fertilizer.

10. The pocket structure of claim 1 wherein the pocket sidewalls are contiguous such that the pocket is square in cross section.

11. The pocket structure of claim 1 wherein the sidewalls further include a left sidewall and a right sidewall, each one of the bottom wall, the upper wall, the left sidewall, and the right sidewall having openings adapted for roots to grow through.

12. The pocket structure of claim 1 wherein forward-most edges of the upper and bottom walls form a planar front face, and wherein the pocket structure is configured such that upon attaching the pocket structure to the RSS earth wall, at least a portion of the front face of the pocket structure is vertical.

13. The pocket structure of claim 12 wherein the front face is configured to contact a wire mesh.

14. The pocket structure of claim 13 wherein a front face of the pocket structure includes tabs adapted to prevent the pocket structure from passing through openings in the wire mesh.

15. The pocket structure of claim 12 wherein the pocket structure is adapted for installation behind a wire mesh and is sized relative to the wire mesh such that the pocket structure is retained by the wire mesh.

16. The pocket structure of claim 12 wherein a lower wall of the pocket structure and the front face form an obtuse angle, such that the lower wall is sloped rearwardly.

17. An earth wall system kit comprising L-shaped wire mesh units, irrigation tubing, pocket structures of claim 1, and drip fittings that are packaged together on a pallet, at least some of the wire mesh units oriented vertically and configured to bear a vertical load.

18. A Reinforced Soil Structure (RSS) earth wall system for creating useable land from a landscape slope, the earth wall system suitable for growing vegetation on a front face thereof, comprising:

a wire mesh, the wire mesh having an opening in its front face;

a reinforcement fabric having a portion that is vertical and proximate the wire mesh front face;

a pocket structure that is located in the opening of the wire mesh, the pocket structure including sidewalls having openings;

vegetation that is located in the pocket structure;

whereby the vegetation is configured to grow on a front face of the wire mesh and whereby the sidewall openings are adapted for roots to grow through into the soil fill.

19. The earth wall system of claim 18 wherein the reinforcement fabric is a vertical secondary reinforcement fabric and the system further includes a horizontal primary reinforcement fabric, and the earth wall system is a vertical earth wall.

20. The earth wall system of claim 18 further comprising an irrigation head located above the pocket structure that is connected to irrigation tubing, and wherein:

the pocket structure is tapered and is to the wire mesh by one or more hooks, and a front face of the pocket structure contacts a backside of the wire mesh, a lower wall of the pocket structure is angled rearward such that gravity aids in holding a containerized plant in the pocket, an upper wall of the pocket structure being angled rearward such that gravity aids in moving water rearward, irrigation tubing runs along the wire mesh to a drip fitting that is located above or in a boss receiver of the pocket structure such that water from the irrigation head flows into a drip channel via a receiver, and the vegetation is a peat pot located in the pocket.

21. The earth wall system of claim 20 wherein the pocket structure and a corresponding peat pot size are tapered at approximately the same angle, and the pocket is sized such that the upper wall of the peat pot is spaced apart from the drip channel by between 0.125 inches and 0.75 inches.

22. The earth wall system of claim 20 further comprising a fertilizer located rearward of the pocket such that water from the drip channel contacts the fertilizer to feed the vegetation.

23. The earth wall system of claim 20 wherein the pocket structure and drip fitting are pre-assembled for shipping.

24. A method of creating useable land from a landscape slope by forming a Reinforced Soil Slope (RSS) earth wall earth wall comprising the steps of:

installing wire mesh units in at least one row on an earth surface;

installing pocket structures on wires of the wire mesh units by engaging the pocket structures with the wire mesh units such that the pocket structures are on a backside of the wire mesh units and sidewall openings of the pocket structures are adapted for roots to grow through;

installing reinforcement fabric at least against a vertical face of the wire mesh units;

installing vegetation into pockets of the pocket structures from a front side of the wire mesh units; and installing soil fill behind the at least on row or wire mesh units.

25. The method of claim 24 wherein the step of installing the reinforcement fabric includes installing the fabric on a backside of the vertical face of the wire mesh units such that the pockets protrude through openings in the fabric.

26. The method of claim 24 further comprising the steps of installing irrigation tubing having a drip openings aligned with the pocket structures and supplying water to the irrigation tubing such that water follows a drip channel rearward toward a back of each one of the pocket structures.

27. The method of claim 24 wherein the step of installing the pocket structures includes installing the pocket structures on the backside of the wire mesh.

28. The method of claim 24 wherein the step of installing the soil fill behind the at least one row of wire mesh units includes installing the soil fill such that the roots of the vegetation are capable of growing into the soil fill, and then repeating all the installing steps to form another row of the earth wall.

29. A pocket structure for installing in a Reinforced Soil Slope (RSS) earth wall, the pocket structure comprising:

an opening adapted for receiving containerized vegetation;

pocket sidewalls including openings that are adapted for roots of the containerized vegetation to grow therethrough, the pocket sidewalls forming a front face thereof;

whereby the pocket structure is adapted to be located in soil fill of an RSS earth wall of the type formed by the soil fill, a wire of a face of the RSS earth wall, and reinforcement fabric; and;

wherein the pocket structure is configured such that when the front face of the pocket sidewalls is vertically oriented in the soil fill of the RSS earth wall, the sidewalls are configured such that gravity holds the containerized vegetation in the pocket structure.

* * * * *